(12) United States Patent  
Pittampalli et al.

(10) Patent No.: US 6,968,186 B2
(45) Date of Patent: Nov. 22, 2005

(54) SYSTEM AND METHOD FOR PREVENTING DROPPED CALLS

(75) Inventors: Eshwar Pittampalli, Randolph, NJ (US); Subramanian Vasudevan, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 805 days.

(21) Appl. No.: 09/726,962

(22) Filed: Nov. 30, 2000

(65) Prior Publication Data

US 2002/0065080 A1    May 30, 2002

(51) Int. Cl.[7] ............................ H04Q 7/20; H04B 7/00
(52) U.S. Cl. .................. 455/422.1; 455/423; 455/436; 455/525
(58) Field of Search .................. 455/436–439, 455/442, 504, 525, 423; 370/331, 332

(56) References Cited

U.S. PATENT DOCUMENTS

| | | | |
|---|---|---|---|
| 6,038,448 A * | 3/2000 | Chheda et al. ............... | 455/436 |
| 6,055,428 A * | 4/2000 | Soliman ...................... | 455/437 |
| 6,151,502 A * | 11/2000 | Padovani et al. ........... | 455/442 |
| 6,216,004 B1 * | 4/2001 | Tiedemann et al. ......... | 455/442 |
| 6,324,401 B1 * | 11/2001 | De Hoz Garcia-Bellido et al. ............... | 455/442 |
| 6,337,984 B1 * | 1/2002 | Hong et al. ................. | 455/439 |
| 6,351,642 B1 * | 2/2002 | Corbett et al. .............. | 455/442 |
| 6,445,918 B1 * | 9/2002 | Hellander .................... | 455/423 |
| 6,546,248 B1 * | 4/2003 | Jou et al. ..................... | 455/436 |
| 6,667,962 B1 * | 12/2003 | Lee et al. .................... | 370/335 |

* cited by examiner

Primary Examiner—Simon Nguyen
(74) Attorney, Agent, or Firm—Julio A. Garceran

(57) ABSTRACT

A system and method for preventing a call from being dropped changes from a first set of serving base station(s) for the call to a second set of serving base station(s) which can be determined independently by both the wireless unit and the wireless communications system. As such, the wireless unit can attempt to recover the call using the second set of serving base station(s) even without the availability of a communication link between the wireless unit and the current set of serving base station(s). The wireless communications system can independently determine a second set of serving base station(s) for the call using information known at both the wireless communication system and at the wireless unit before the communication link was severed. For example, the wireless unit and the communications system can determine the second set of serving base station(s) using the candidate list identified with a previous pilot strength measurement message (PSMM) known to have been successfully reported to the wireless communications system. After the wireless communications system and the wireless unit determine that a call is in danger of being dropped, the wireless unit and the wireless communications system can automatically add base station(s) in the candidate set to the active set in attempting to recover the call.

12 Claims, 7 Drawing Sheets

WIRELESS UNIT

WIRELESS COMMUNICATIONS SYSTEM

WIRELESS UNIT

WIRELESS COMMUNICATIONS SYSTEM

SYSTEM AND METHOD FOR PREVENTING DROPPED CALLS

BACKGROUND OF THE INVENTION

1. Field of the Invention

This invention relates to wireless communications and, more particularly, to a system and method for preventing dropped calls.

2. Description of Related Art

FIG. 1 depicts a diagram of a portion of a typical wireless communications system 10, which provides wireless communications service to a number of wireless or mobile units 12a–c, that are situated within a geographic region. The geographic region serviced by a wireless communications system is divided into spatially distinct areas called "cells." Each cell is schematically represented by one hexagon in a honeycomb pattern; in practice, however, each cell has an irregular shape that depends on the topography of the terrain surrounding the cell and other factors. A conventional cellular system comprises a number of cell sites or base stations 14a–d, geographically distributed to support transmission and receipt of communication signals to and from the wireless units. Each cell site handles voice communications over a cell, and the overall coverage area for the cellular system is defined by the union of cells for all of the cell sites, where the coverage areas for nearby cell sites overlap to some degree to ensure (if possible) contiguous communications coverage within the outer boundaries of the system's coverage area. One cell site may sometimes provide coverage for several sectors.

A base station 14a–d comprises the radios and antennas that the base station uses to communicate with the wireless units in that cell and also comprises the transmission equipment that the base station uses to communicate with a Mobile Switching Center (MSC) 16. The Mobile Switching Center 16 is responsible for, among other things, establishing and maintaining calls between the wireless units 12a–c, between a wireless unit 12a–c and a wireline unit 18 via a public switched telephone network (PSTN) 20 or between a wireless unit 12a–c and a packet data network (PDN) 22, such as the Internet. Depending on the embodiment, a base station controller (BSC) can be a separate base station controller (BSC) 24 connected to several base stations 14a–c or a base station controller (not shown) located at each base station 14a–c which administers the radio resources for the base stations and relays information to the MSC 16.

When active, a mobile unit receives forward link signals from and transmits reverse link signals to (at least) one cell site or base station. Each active mobile unit is assigned a forward link on which it receives its forward link signals on at least one forward link channel and a reverse link on which it transmits reverse link signals on at least one reverse link channel. There are many different schemes for defining forward and reverse link channels for a cellular telephone system, including TDMA (time-division multiple access), FDMA (frequency-division multiple access), and CDMA (code-division multiple access) schemes. In CDMA communications, different channels are distinguished by different spreading sequences that are used to encode different information streams, which may then be modulated at one or more different carrier frequencies for simultaneous transmission. A receiver can recover a particular information stream from a received signal using the appropriate spreading sequence to decode the received signal.

A detailed sequence of activities are typically followed before the mobile unit can access the wireless communications system to establish or receive a call. As is known in the art, calls between a CDMA mobile unit and a base station typically employ several kinds of control channels. Initially, a pilot channel is employed to continually broadcast certain system synchronization and timing information to all mobile units in an area. After initial synchronization is achieved at a mobile unit, a sync channel is used to establish more specific time and frame synchronization at the mobile unit. The sync channel message also provides information about another class of channels, the paging channels. Paging channels are used to broadcast a variety of control information. Other overhead messages are sent between the mobile unit and the base station to facilitate communications over forward and reverse link traffic channels between the wireless unit and the base station over which voice and/or data information is sent.

In CDMA communications, the wireless unit searches for pilot signals of base stations on an active set, a candidate set and a neighbor set. The active set is the set of base stations through which active communications is established. The neighbor set is the set of base stations surrounding an active base station having some probability of having a signal strength of sufficient level to establish communications, and the candidate set is a set of base stations having a pilot signal strength at a sufficient level to establish communication with the wireless unit with a probability close to the active set. The wireless unit measures the signal strengths of the pilot signals and provides the pilot signal measurements in a pilot strength measurement message (PSMM) to the wireless communications system through a serving base station. The wireless unit determines which base stations are in the candidate set based on the pilot signal strength measurements. The wireless units sends the pilot signal measurements for the candidate and active base stations in the PSMM. Receipt of the PSMM is acknowledged by the wireless communication system to the wireless unit. When a pilot signal of a base station in the neighbor set exceeds a predetermined threshold level, the base station is added to the candidate set. When the wireless unit detects a pilot of sufficient strength which is associated with a base station in the candidate set, the wireless communications system determines whether to update the active set and assign a traffic channel from the base station to the wireless unit. The wireless unit is said to be in soft handoff if it is assigned traffic channels from more than one base station.

All base stations connected to a given wireless unit define the active set of that mobile, and an active set update function controls, i.e., evaluates and updates, this active set based on the pilot strength measurements. At the wireless unit, the strongest pilots are detected and measured by the measurement process. The signal strength values are then collected into the pilot measurement report, which is sent to the wireless communications system. When the active set update function is invoked, the base stations within the active set from which the strongest and weakest pilot are received are identified. If the difference is greater than the system desired value (called active set window), the weakest base station will be removed from the active set. A base station is added to the active set window if its received pilot signal strength is within the window above an active set threshold value, provided the active set size is not exceeded. If the active set size is full, the weakest base station in the active set will be replaced by the new base station if the corresponding pilot signal strength is higher than the weakest base station.

Currently, when a call is in progress, the wireless unit continuously monitors the forward traffic channel. If the wireless unit receives a signal of inadequate quality over a period of 12*20 ms (or 12 bad frames) on the forward channel from the serving base station(s) in the active set, the wireless unit turns off its transmitter on the traffic channel and starts counting down a five second fade timer. The wireless unit retransmits again and resets the fade timer to 5 seconds if it receives sufficient signal quality for a period of 2*20 ms (or 2 consecutive good frames) from the same base station(s) before the fade timer expires. If the fade timer expires, the wireless unit declares a loss of forward traffic channel and terminates the call. It is possible however that even as the fade timer is running down, the wireless unit changes its location. This may in turn make it possible for the call to be sustained via other base stations in the vicinity of the wireless unit that were not previously serving this call. However, due to the broken communication link between the wireless unit and the serving base station(s), it is not currently possible in CDMA communications systems, for either the network or the mobile to take action to recover the call via this new set of base stations. This is because any change in the serving base station(s) in the active set relies of the availability of a communication link between the wireless unit and the current set of serving base station(s).

For example, the wireless unit can only communicate on the traffic channel with the serving base station(s) in the active set. In order to propose changes to the active set, the wireless unit sends the pilot strength measurements (for example, using the Pilot Strength Measurement Message (PSMM)) to the serving base station(s). The base station may then send a handoff direction to direct the wireless unit to change the active set. If the communication link between the mobile station and the serving base stations breaks any time during this process, the serving base station(s) in the active set will not be successfully changed, and the call may be dropped if the wireless unit cannot reestablish the call with the current set of serving base station(s) in the active set.

SUMMARY OF THE INVENTION

The present invention is a system and method for preventing a call from being dropped by changing from a first set of serving base station(s) for the call to a second set of serving base station(s) which can be determined independently by both the wireless unit and the wireless communications system. As such, the wireless unit can attempt to recover the call using the second set of serving base station(s) even without the availability of a communication link between the wireless unit and the current set of serving base station(s). The wireless communications system can independently determine a second set of serving base station(s) for the call using information known at both the wireless communication system and at the wireless unit before the communication link was severed. For example, the wireless unit and the communications system can determine the second set of serving base station(s) using the candidate list identified with a previous pilot strength measurement message (PSMM) known to have been successfully reported to the wireless communications system. After the wireless communications system and the wireless unit determine that a call is in danger of being dropped, the wireless unit and the wireless communications system can automatically add base station(s) in the candidate set to the active set in attempting to recover the call.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
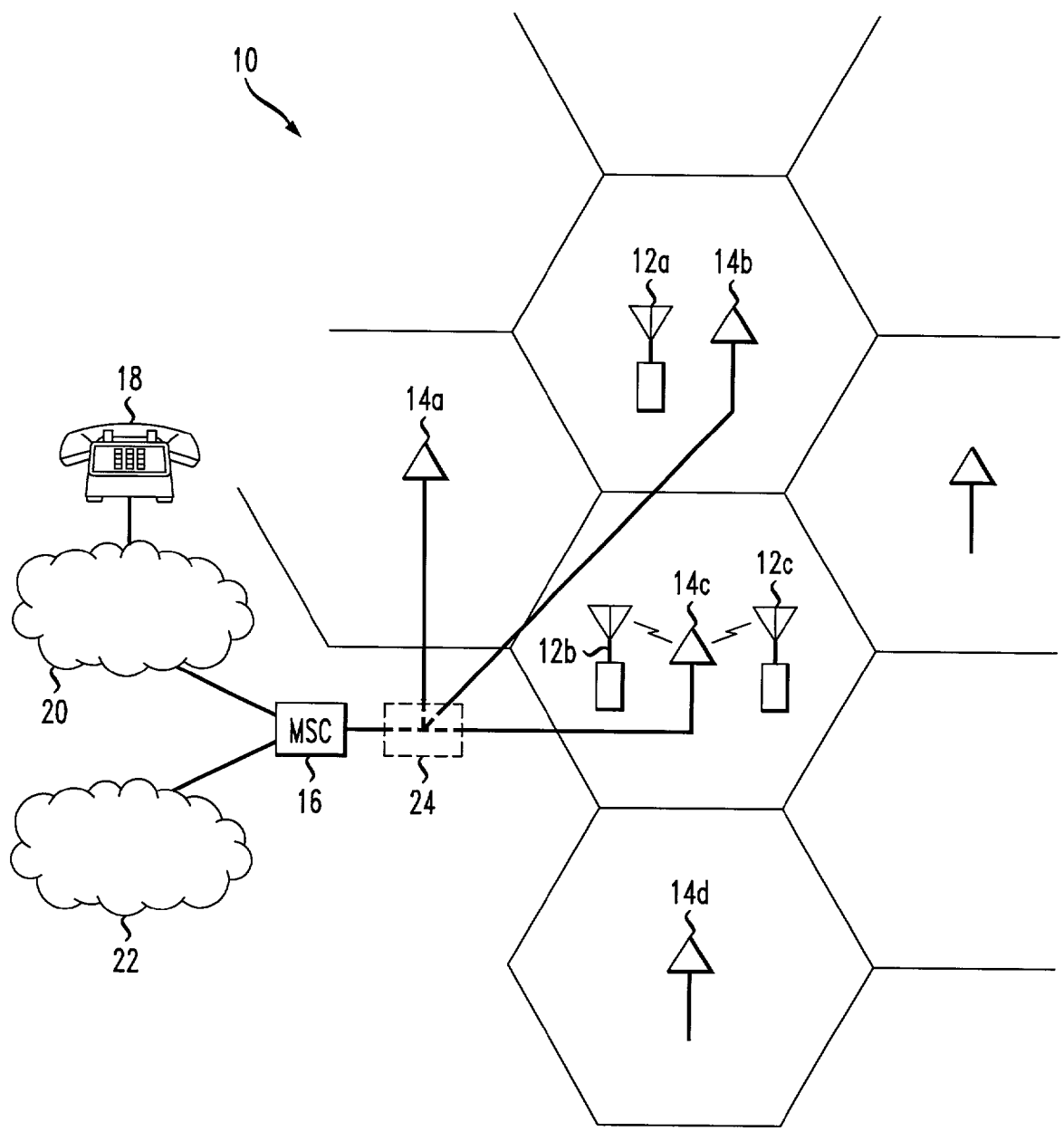
FIG. 1 shows a general diagram of a portion of a wireless communications system in which the call recovery system according to principles of the present invention can be used.
Figure 2:
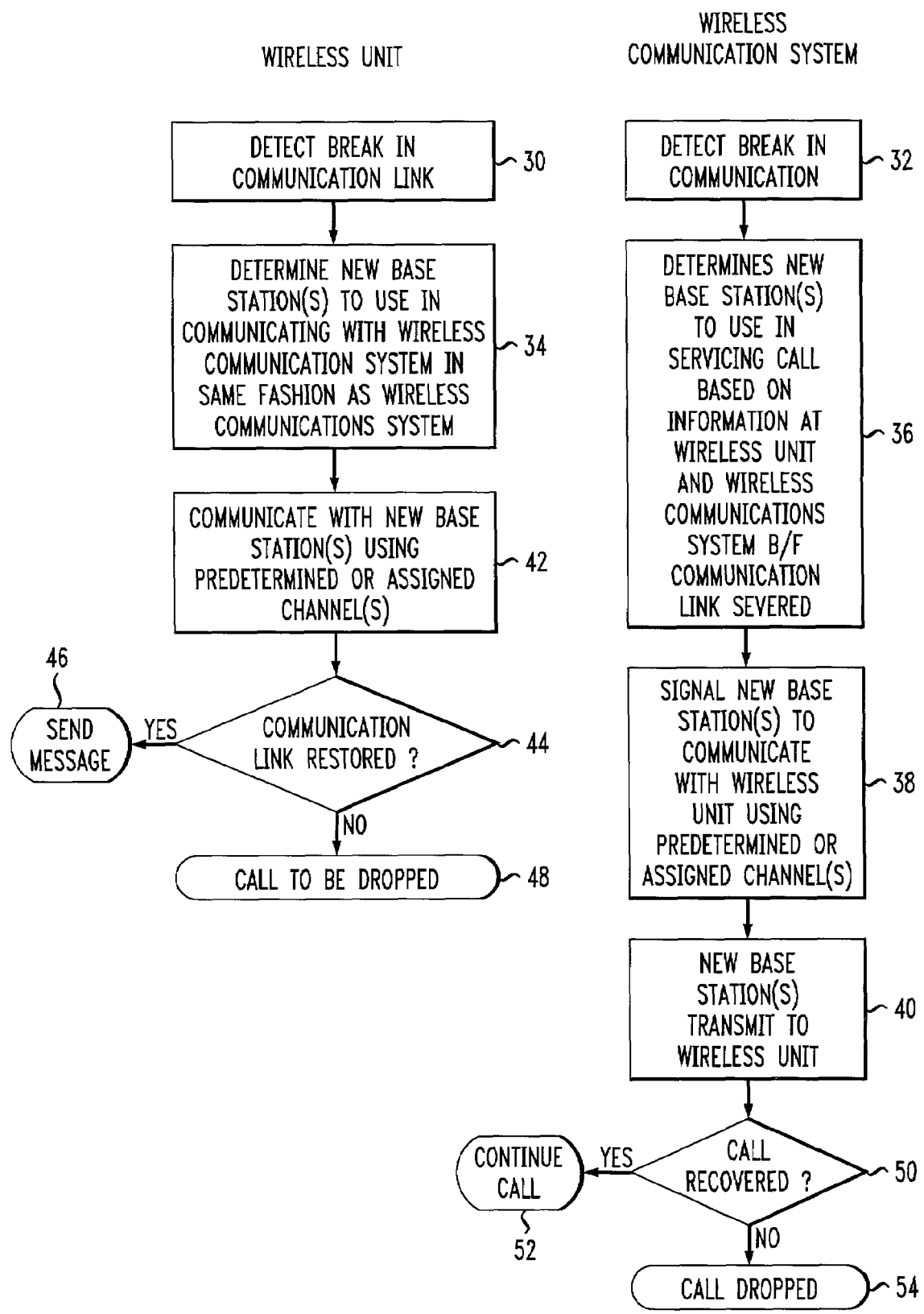
FIG. 2 shows a general flow diagram of a call recovery system using principles of the present invention.

Illustrative embodiments of the system and method for preventing dropped calls or call recovery system is described in relation to a CDMA cellular wireless communications system, but embodiments of the described system and method can be used with other wireless communications systems. FIG. 2 shows a general flow chart for an embodiment of the system and method for preventing dropped calls between a wireless unit and a wireless communications system. In this embodiment, in block 30, the wireless unit detects a break in the communication link, for example after detecting a plurality of consecutive bad frames over the forward traffic channel from the current set of base station(s). In block 32, the wireless communications system similarly detects a possible dropped call after having lost communication with the wireless unit. After any attempt(s) to recover the call using the current base station(s) or first set of base station(s), the wireless unit at block 34 determines new base station(s) or a second set of base station(s) to use in communicating with the wireless communications system unit based on the same information known to be in the possession of the wireless unit and the wireless communication system before the communication link was severed. For example, the wireless unit can automatically promote or designate the base station(s) in the candidate set as active. In similar fashion at block 36, the wireless communication system independently determines the new base station(s) to use in servicing the call based on the same information known to be in the possession of the wireless unit, for example in the last PSMM sent by the wireless unit and acknowledged by the wireless communication system.

With the new base station(s) independently established at the wireless unit and the wireless communications system, the wireless communication system signals the new base station(s) to communicate with the wireless unit using the predetermined or assigned channel(s) at block 38. For the wireless unit to receive the transmissions from the new base station(s), the wireless unit must know which channels to receive. Accordingly, the wireless communications system either transmits over a predetermined channel known at the wireless unit, or the wireless communication system can identify over a control channel known at the wireless unit the channel(s) the wireless unit is to use in communicating with the new base station(s). At block 40, the new base station(s) transmit to the wireless unit over the predetermined or indicated channel(s), and at block 42, the wireless unit receives the signals from the new base station(s) on the predetermined or indicated channel(s). The wireless unit can also transmit over reverse link channel(s) identified to the new base station(s) by the wireless communications system.

If at block 44, the wireless unit determines that the communications link is restored, for example after receiving consecutive good frames over the link from the new base station(s), the wireless unit can send a message at block 46 which indicates to the wireless communications system that the call is recovered. Otherwise, the wireless unit may determine that the call is to be dropped at block 48. At block 50, the wireless communications system determines whether the call is recovered, for example by receiving a message or signals from the wireless unit which indicates that the link is restored. If the call is recovered, the call continues using the new base station(s) at block 52. Otherwise, the call can be dropped at block 54.

Figure 3:
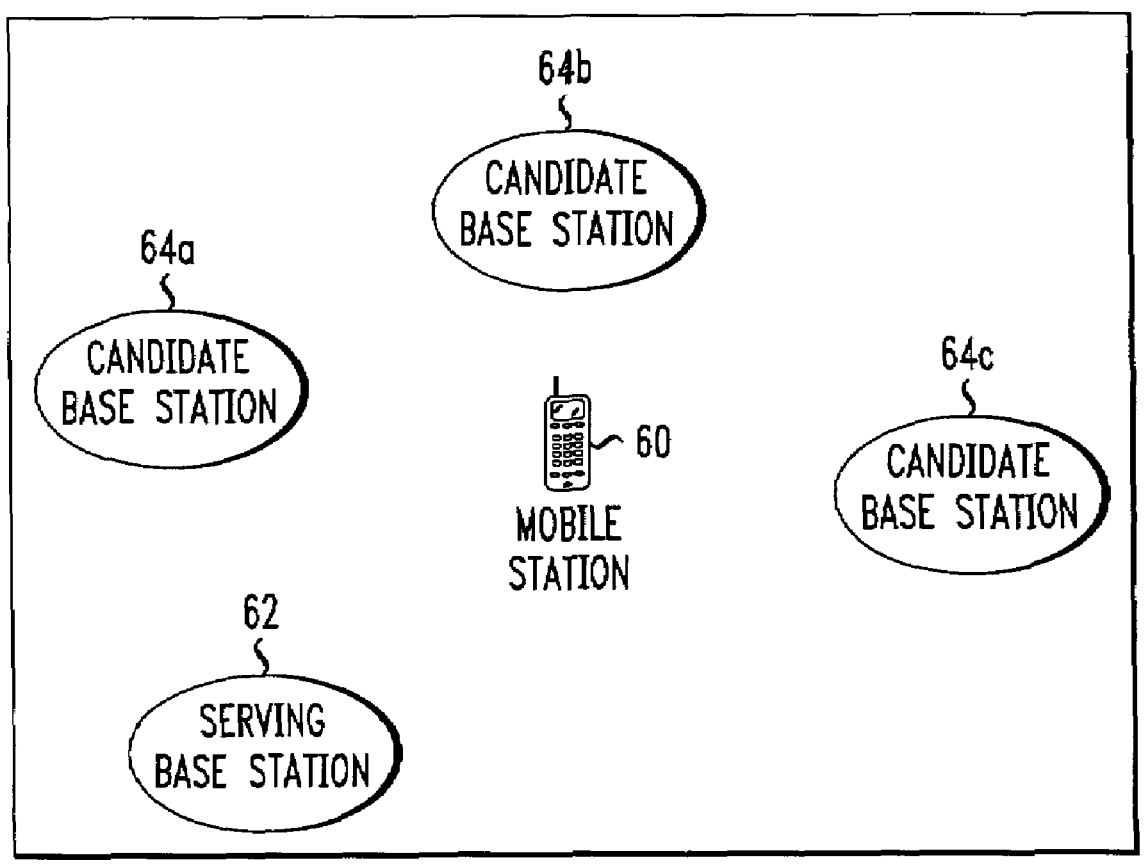
FIG. 3 shows a general diagram of serving and candidate base stations for a wireless unit.

FIG. 3 shows a wireless unit 60 which is being serviced by a serving base station 62 which is the active set for the wireless unit 60. Candidate base stations 64a–c are shown which are currently listed in a candidate set currently known within the wireless unit 60 and the wireless communications system from the last acknowledged PSMM sent to the wireless communications system. Based on pilot signal measurements, the wireless unit determines which base station(s) are in the candidate set. The wireless unit sends the pilot signal measurements for the candidate and active base stations to the wireless communications system using a pilot strength measurement message (PSMM). As such, any updates to the candidate set are performed at the wireless unit 60. The term wireless communications system refers to any base station, base station controller, MSC and/or other wireless communication system sub-systems used in providing wireless communication services to wireless units.

Figure 4:
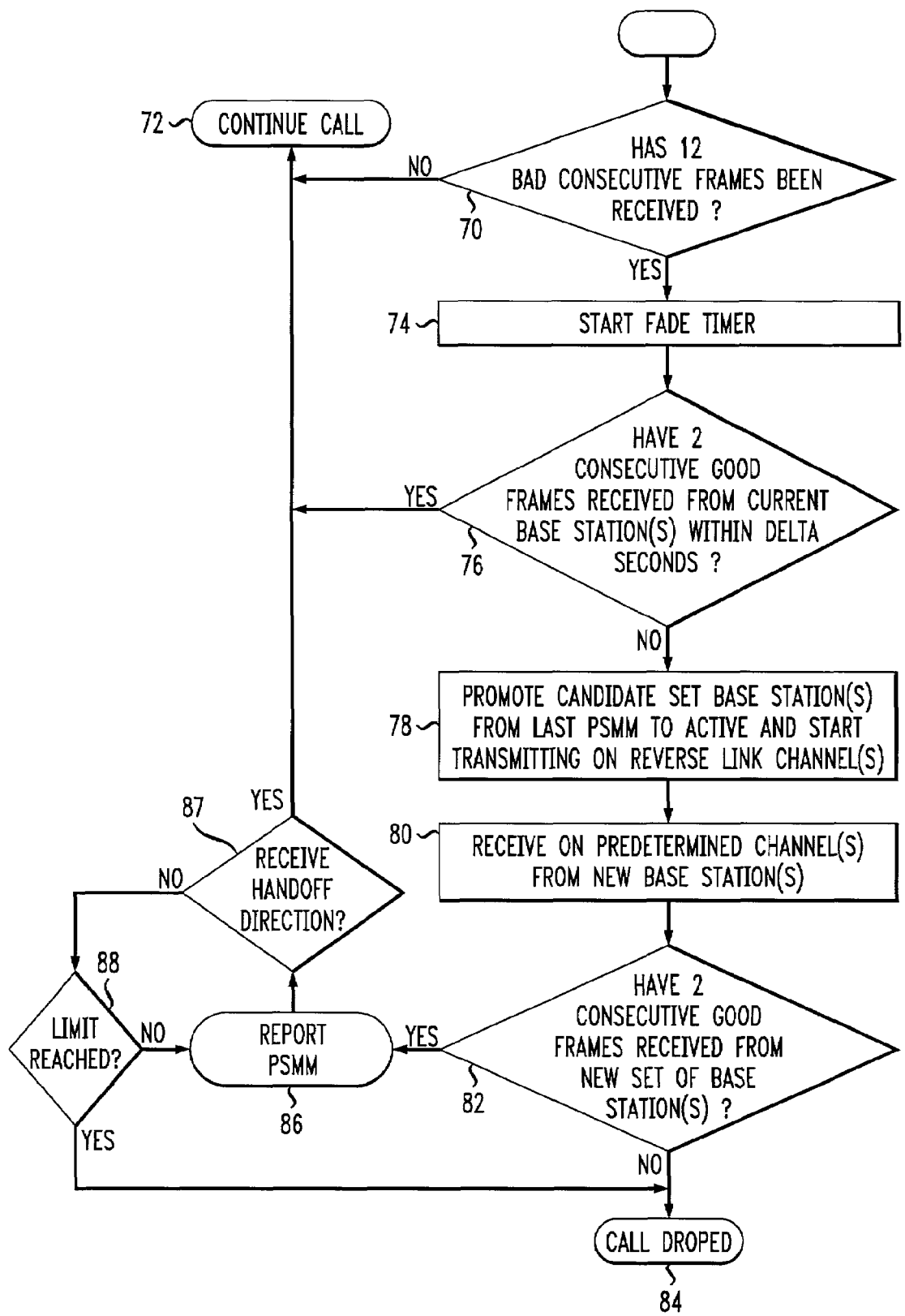
FIG. 4 shows a more detailed flow diagram of an embodiment of the call recovery system according to principles of the present invention.
Figure 4:
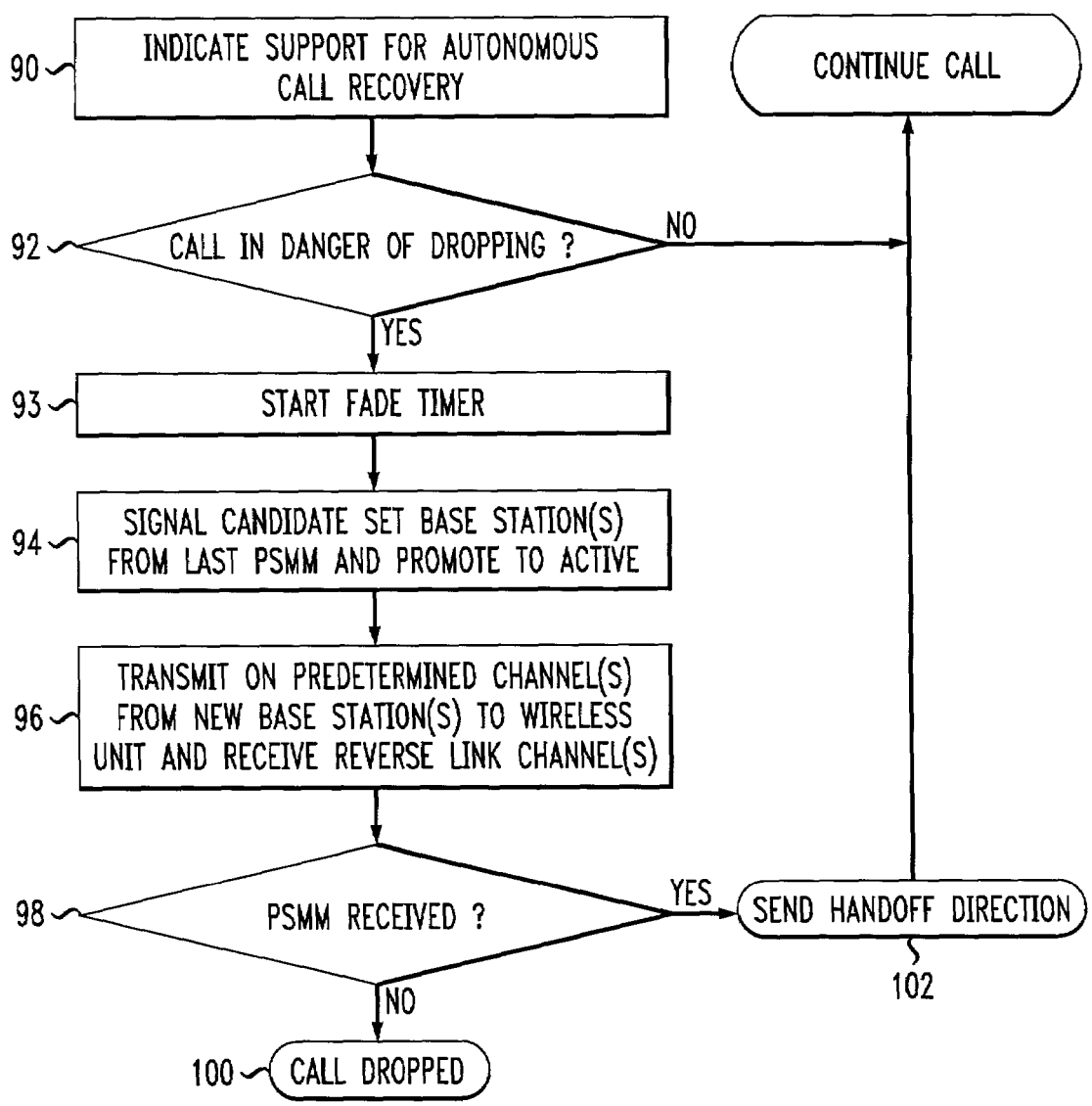

FIG. 4 shows a more detailed flow diagram for one embodiment of a call drop prevention or autonomous call recovery system according to principles of the present invention. In the embodiment of FIG. 4, candidate base stations 64a–c (FIG. 3) are promoted to the active set for the wireless unit 60 to recover a communications link between the wireless unit 60 and the wireless communications to prevent the call from being dropped or to recover the call. In transmitting and receiving from the new set of base station(s) in the active set, the wireless communications system and the wireless unit use predetermined channel(s) for the candidate base stations 64a–c added to the active set which are known at the wireless communications system and at the wireless unit.

As shown in FIG. 4, the wireless unit determines at block 70 whether it has received 12 frames of insufficient signal quality on the forward traffic channel in this embodiment. If not, the wireless unit continues with the call at block 72. Otherwise, the wireless unit starts a fade timer at block 74 and waits an additional DELTA milliseconds for the call to recover from the current serving base station(s) (i.e. receive two consecutive good frames as shown in block 76). The DELTA is provided to allow for the call to recover on the serving base station(s) before attempting to use a larger or different set of base stations to serve the call. If at block 76 the call has not been recovered using the current base station(s), the wireless unit then automatically promotes candidate set base stations corresponding to the pilot signals from the last PSMM successfully received by the wireless communications system to active status at block 78. The wireless unit can start transmitting on reverse link channel(s) identified to the promoted candidate base station(s) by the wireless communications system. In this embodiment, as many base stations are promoted as are allowed by the active set size limit and the number of active set base stations with corresponding pilot signals in that PSMM. In other words, in this embodiment, the base stations in the current active set are not displaced. Rather, as many additional candidate base stations are added to the active set as the size restriction on this set will allow. If there are no candidate base stations, the wireless unit shall continue monitoring the first set of base stations until consecutive good frames are received or the fade timer expires, for example after 5 seconds.

In this embodiment, the wireless communications system supports the designation and use of a pre-designated or pre-allocated forward traffic channel (for example, a channel identified by its Walsh code) to communicate with a wireless unit that is in danger of dropping a call. Accordingly, as shown in block 80, the wireless unit commences demodulation and soft combining of the forward traffic channels from the base stations serving the call before the link to the wireless unit broke as well as the promoted candidate base stations corresponding to pilot signals in the candidate set from the last successfully transmitted PSMM. These additional traffic channels from the new base station(s) are carried on a pre-designated channel(s), for example a specific Walsh code(s) forming a code channel(s)

If, at block 82, the wireless unit does not receive 2 consecutive good frames from this expanded or new set of serving base station(s) by the time the fade timer expires, for example after five seconds, the call is dropped at block 84. If the wireless unit receives 2 consecutive good frames at the block 82 before the fade timer expires, the wireless unit enables its transmitter and reports a PSMM at block 86. In this embodiment, the wireless unit waits for a handoff direction message at block 87 from the second or new set of serving base station(s). If the handoff direction message is received, the wireless unit can reduce and optimize the set of base stations in its active set as directed in the message, for example based on the pilot signal measurements in the PSMM sent at block 86, and continue with the call along its normal course. If the handoff direction message is not received after a certain time, the wireless unit proceeds to block 88 to determine if the limit on the number of re-transmissions for the PSMM has been reached. If not, the wireless unit proceeds to block 86 to retransmit the PSMM. If the limit is reached, the call is dropped at block 84.

An embodiment of the wireless communications system supporting autonomous call recovery can follow the following procedures. In this embodiment, the wireless communications system indicates support for autonomous call recovery with or without pre-allocated forward traffic channels (i.e. Option A or Option B), to each wireless unit in a new or an existing overhead message on the Broadcast Control Channel/Paging Channel at block 90. This could occur when a wireless unit registers with the wireless communications system or network. Periodic PSMM reporting may be enabled at the base stations supporting either option. This will minimize the time delay between the last successful transmission of a PSMM from the wireless unit to the wireless communications system and the time at which the wireless unit autonomously promotes candidate base stations to active status during the call recovery procedure.

At block 92, the wireless communications system detects that a call is in danger of dropping, for example using one or a combination of the following metrics: 12 consecutive bad frames received from the wireless unit, no acknowledgement from the wireless unit of a handoff direction message from the wireless communications system, and/or absence of transmission, i.e. no signal from the wireless unit. If so, the wireless communications system starts a fade timer at block 93 and refers to the last PSMM received from the wireless unit. At block 94, the wireless communications system communicates to the candidate base station(s) listed in this message, the identity of, and parameters associated with, the wireless unit that is sought to be assisted. These candidate base stations are automatically promoted to active status subject to restrictions on active set size, without displacing any of the current active set members in this embodiment. If the first active set is large, some active set members can be displace, for example the active set base stations with the weakest pilot signal measurements being replaced by candidate set base stations with the strongest pilot signal strength measurements. Depending on the embodiment and the wireless communications system architecture, communication between the base stations can be routed via a base station controller that maintains all the updated parameters relating to the call.

In the embodiment of FIG. 4, the promoted base station(s) then activate transmissions on the pre-allocated traffic channel to the wireless unit at block 96 and monitor or receive the reverse link for the wireless unit transmissions. In this embodiment, the original serving base station(s) continue to operate as before in transmitting to the wireless unit and monitoring the reverse link for transmissions from the wireless unit. If no transmission, for example a PSMM, is detected from the wireless unit before the base station fade timer expires as determined at block 98, all base stations in the new active set stop transmitting on the forward channels, all base station resources are freed up, and the call is deemed to have dropped at block 100. If a PSMM is successfully received from the wireless unit within the time allowed for call recovery at block 98, a handoff direction is sent to the mobile identifying the new optimal set of serving base station(s) and associated traffic channel(s) for the call at block 102.

Figure 5:
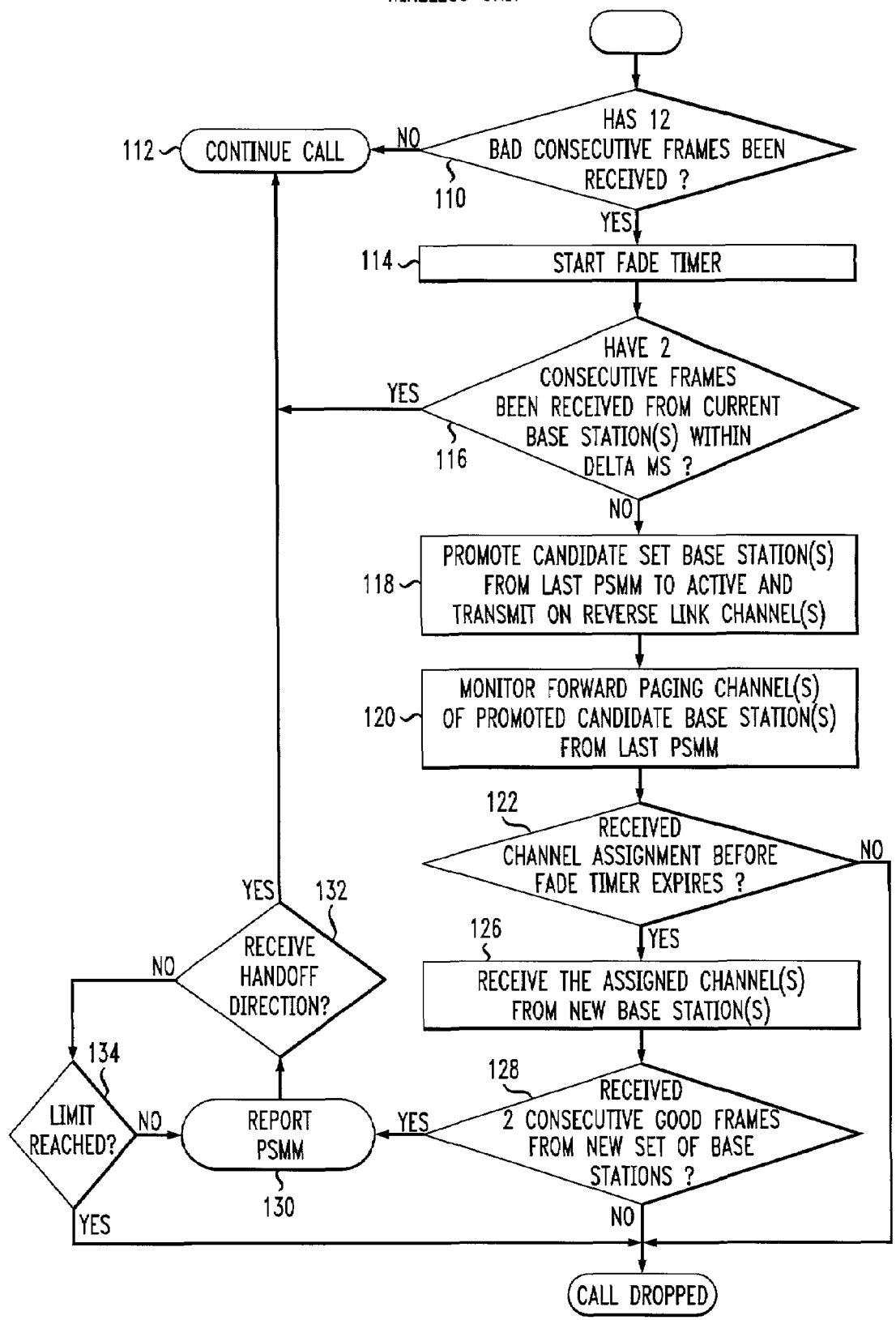
FIG. 5 shows another embodiment of the call recovery system according to principles of the present invention.
Figure 5:
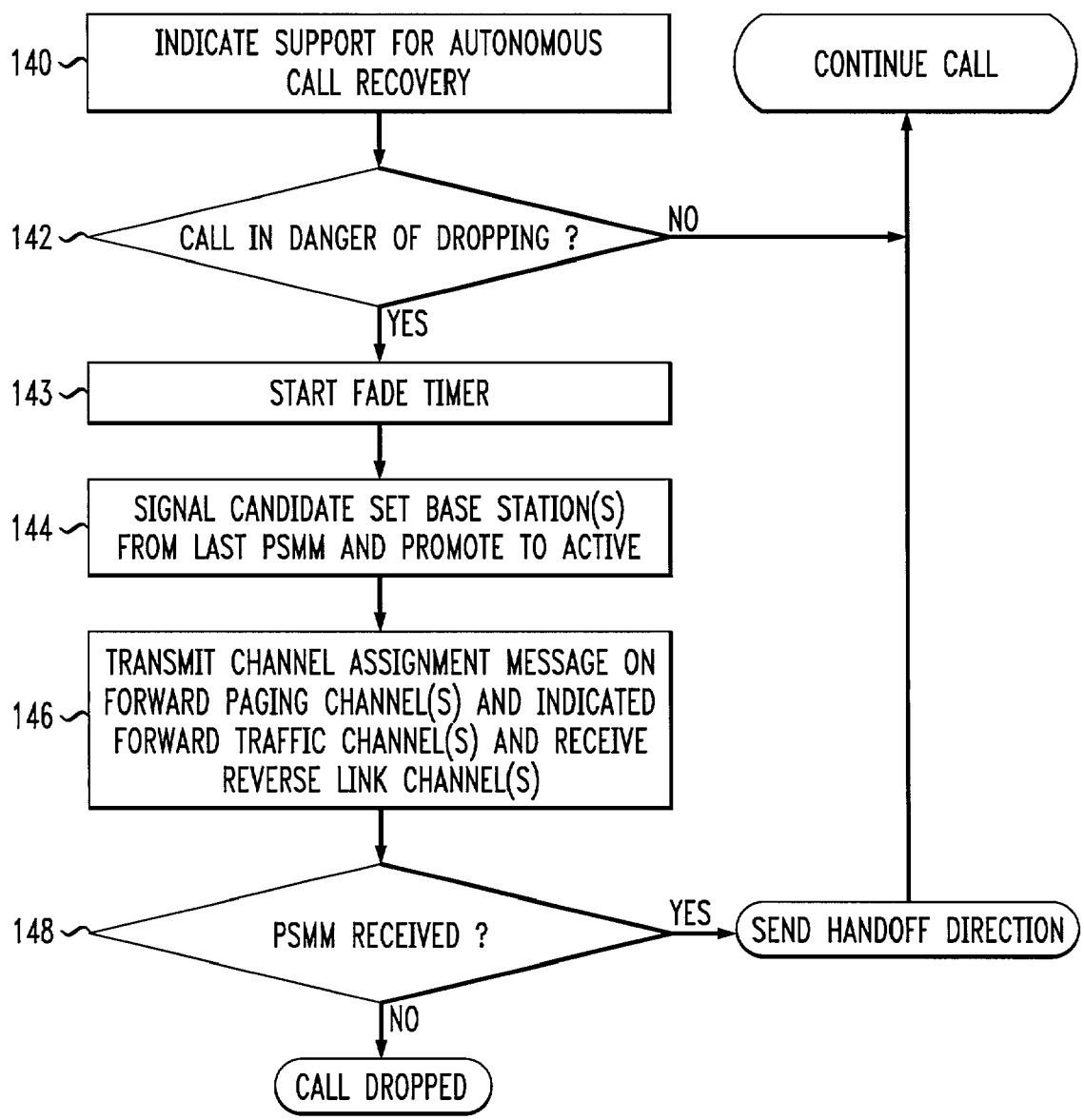

FIG. 5 shows a flow diagram for an alternative embodiment of an autonomous call recovery system according to principles of the present invention. In the embodiment of FIG. 5, candidate base stations 64a–c (FIG. 3) are promoted to the active set for the wireless unit 60 to recover a communications link between the wireless unit 60 and the wireless communications to prevent the call from being dropped or to recover the call. In communicating with the new set of base station(s) in the active set, the wireless communications system and the wireless unit use channel(s) assigned to the candidate base stations 64a–c added to the active set, and the promoted candidate base stations 64a–c transmit the channel assignment to the wireless unit over a control channel.

As shown in FIG. 5, the wireless unit determines at block 110 whether it has received 12 frames of insufficient signal quality on the forward traffic channel. If not, the wireless unit continues with the call at block 112. Otherwise, wireless unit starts a fade timer at block 114 and waits an additional DELTA milliseconds for the call to recover from the current serving base station(s) (i.e. receive two consecutive good frames as shown in block 116). The DELTA is provided to allow for the call to recover on the serving base station(s) before attempting to use a larger or different set of base stations to serve the call. If at block 116 the call has not been recovered using the current base station(s), the wireless unit then automatically promotes candidate set base stations corresponding to the pilot signals from the last PSMM successfully received by the wireless communications system to active status at block 118. The wireless unit can start transmitting on the reverse link channel(s). In this embodiment, as many base stations are promoted as are allowed by the active set size limit and the number of active set base stations with corresponding pilot signals in that PSMM. In other words, in this embodiment, the base stations in the current active set are not displaced. Rather, as many additional candidate base stations are added to the active set as the size restriction on this set will allow. If there are no candidate base stations, the wireless unit shall continue monitoring the first set of base stations until consecutive good frames are received or the fade timer expires, for example after 5 seconds.

In the embodiment of FIG. 5 where there is no predetermined forward traffic channel for call recovery, the wireless unit stops monitoring the forward traffic channel(s) and, at block 120 switches to monitoring the forward paging channels associated with the new base stations that present the strongest pilots within the candidate set of the last PSMM. If, at block 122, the wireless unit does not successfully receive a channel assignment message on any of these forward paging channels before the fade timer expires, the wireless unit terminates the call at block 124. The wireless unit may either listen to the strongest paging channel, or combine the transmissions from the paging channels from the different promoted candidate base stations in some manner to reliably receive the channel assignment message. If, at block 122, the wireless unit finds and successfully receives a channel assignment message on one of these paging channels, it knows the forward traffic channels being used by the candidate set base stations to transmit to it. In this embodiment, each promoted candidate base station sends a channel assignment message including channel assignments for all the promoted candidate base stations.

At block 126, the wireless unit then commences demodulation and soft combining of the forward traffic channels from the base stations serving the call before the link to the wireless unit broke as well as the autonomously promoted candidate base stations (whose forward traffic channels have been identified in the channel assignment message). If, at block 128, the wireless unit receives 2 consecutive good frames before the fade timer expires, the wireless unit enables its transmitter and reports a PSMM at block 130. In this embodiment, the wireless unit waits for a handoff direction message at block 132 from the second or new set of serving base station(s). If the handoff direction message is received, the wireless unit can reduce and optimize the set of base stations in its active set as directed in the message, for example based on the pilot signal measurements in the PSMM sent at block 130, and continue with the call along its normal course. If the handoff direction message is not received after a certain time, the wireless unit proceeds to block 134 to determine if the limit on the number of re-transmissions for the PSMM has been reached. If not, the wireless unit proceeds to block 130 to re-transmit the PSMM. If the limit is reached, the call is dropped at block 124.

In the embodiment of the autonomous call recovery system and method in a wireless communications system, the wireless communications system indicates support for autonomous call recovery with or without pre-allocated forward traffic channels (i.e. Option A or Option B), to each wireless unit in a new or an existing overhead message on the Broadcast Control Channel/Paging Channel at block 140. This could occur when a wireless unit registers with the wireless communications system or network. Periodic PSMM reporting may be enabled at the base stations supporting either option. This will minimize the time delay between the last successful transmission of a PSMM from the wireless unit to the wireless communications system and the time at which the wireless unit autonomously promotes candidate base stations to active status during the call recovery procedure.

At block 142, the wireless communications system detects that a call is in danger of dropping, for example using one or a combination of the following metrics: 12 consecutive bad frames received from the wireless unit, no acknowledgement from the wireless unit of a handoff direction message from the wireless communications system, and/or absence of transmission, i.e. no signal from the wireless unit. If so, the wireless communications system starts a fade timer at block 143 and refers to the last PSMM received from the wireless unit. At block 144, the wireless communications system communicates to the candidate base station(s) listed in this message, the identity of, and parameters associated with, the wireless unit that is sought to be assisted. These candidate base stations are automatically promoted to active status subject to restrictions on active set size, without displacing any of the current active set members in this embodiment. If the first active set is large, some active set members can be displace, for example the active set base stations with the weakest pilot signal measurements being replaced by candidate set base stations with the strongest pilot signal strength measurements. Depending on the embodiment and the wireless communications system architecture, communication between the base stations can be routed via a base station controller that maintains all the updated parameters relating to the call.

In the embodiment of FIG. 5, at block 146, the promoted base station(s) activate transmissions on their forward paging channels indicating the forward channel(s) to be used for communicating with the wireless unit. At the same time, these base station(s) also commence transmission to the mobile on these forward channels and monitor the reverse link channel(s) for wireless unit transmissions. In this embodiment, the original serving base stations continue to transmit to, and monitor reverse link channel(s) from, the wireless unit as before. If no transmission, for example a PSMM, is detected from the wireless unit before a base station fade timer expires at block 148, all base stations in the new active set stop transmitting on the forward channels, all base station resources are freed up, and the call is deemed to have dropped at block 150. If, at block 148, a PSMM is successfully received from the wireless unit within the time allowed for call recovery, such as the fade timer expiring, a handoff direction is sent to the wireless unit at block 152 identifying the new optimal set of serving base stations for the call.

The above described embodiments of the autonomous call recovery system can be adapted depending on the wireless communications system and the application as would be understood by one of skill in the art. For example, in the wireless communication system supporting call recovery using predetermined channel(s) for the promoted candidate base stations to communicate with the wireless unit as in FIG. 4, two different serving base stations each could detect a call in the process of dropping. If the candidate sets associated with the last PSMM of the two wireless units in question overlap, the base station controller could decide on the sequence in which the wireless units are to be rescued. This would imply that the candidate base stations associated with one of the two wireless units are first promoted to active status and commence transmission to that mobile using the predetermined Walsh code. Once the call is successfully re-established and moves to a different Walsh code (traffic channel), the base station controller can direct recovery of the second call. This approach is successful as long as the first mobile call is recovered before the fade timer for the second expires. Furthermore, if two calls are determined by a single serving base station to be in the process of dropping, and again, their associated PSMM candidate sets overlap, the same process is followed. If there is no overlap, there is no bar on simultaneous recovery of both calls.

Another possibility is that a promoted candidate base station is also serving a call that is about to drop. Here there is no bar to the base station recovering the newly added wireless unit on the predetermined forward traffic channel while at the same time attempting to recover the call that it was already the serving base station for. In the wireless communication system supporting call recovery using assigned channel(s) sent to the wireless unit from the promoted candidate base stations as in FIG. 5, there is no bar to simultaneous call recovery in any of the previously mentioned scenarios since each call recovery attempt uses different forward paging and forward traffic channel resources.

In the embodiments described above, the call recovery system according to the principles of the present invention is described as being used in a code division multiple access (CDMA) system, such as a wireless communication system conforming to the developing wireless standard known generally as TIA/EIA/IS-2000-B ("IS-2000-B" or "cdma2000") or any evolutions thereof. The call recovery system described herein can be used with different cellular systems, such as systems conforming to the standard known as the Universal Mobile Telecommunications Service (UMTS), or using different multiple access techniques, such as TDMA, for sending data and/or voice to wireless units. Embodiments of the call recovery system can omit and/or add components and/or use variations or portions of the described call recovery system. For example, the first set of base station(s) and the second set of base station(s) can overlap or be mutually exclusive. Depending on the embodiment, different manners of selecting the second set of base station(s) can be used, for example using neighbor set base station(s).

Furthermore, it should be understood that different notations, references and characterizations of the various architecture blocks can be used. For example, the call recovery system has been described as being implemented within a wireless communications system, but it should be understood that the system and portions thereof and of the described wireless communications system can be implemented by processing circuitry in different locations within the wireless unit and/or the wireless communications system, such as the wireless unit, the base station(s), the base station controller(s) and/or MSC(s). Moreover, logic or hardware required to implement and use the call recovery system can be implemented in application specific integrated circuits, software-driven processing circuitry, firmware, programmable logic devices, hardware, discrete components or arrangements of the above components or processing circuitry as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of recovering a call between a wireless unit and a wireless communications system comprising the steps of:

after having lost communication between said wireless unit and a first set of base station(s) servicing said call, autonomously changing from said first set of base station(s) to a second set of base station(s), independent of said wireless communications system and based on information known to be at both the wireless unit and the wireless communications system before said communications between said wireless unit and said first set of serving base station(s) is lost such that said second set of base station(s) is automatically established both at said wireless communications system and said wireless unit without requiring communication between said wireless communications system and said wireless unit, to service said call; and communicating with said second set of serving base station(s) to continue said call.

2. The method of claim 1 wherein said step of communicating comprising the step of:

using a channel which can be determined at both the wireless communication system and at the wireless unit before said communication is lost between said wireless unit and said first set of serving base station(s) to receive communications from said at least one of said second set of base station(s) after said communication is lost with said first set of serving base station(s).

3. The method of claim 2 further including the step of:

using, after communication between said wireless unit and said first set of serving base station(s) is lost, a candidate list identified with a previous pilot strength measurement message (PSMM) known to have been successfully reported to the wireless communications system before said communication between said wireless unit and said first set of serving base station(s) is lost to establish said second set of base station(s) at said wireless unit and said wireless communications system to service said call between said wireless unit and said wireless communications system.

4. The method of claim 3 wherein said step of changing including the step of:

automatically designating base station(s) in said candidate set as active.

5. The method of claim 4 further comprising:

receiving a channel assignment message, over a predetermined control channel from at least one of said second set of base station(s), which provides at least forward channel assignments for at least one of said second set of base station(s).

6. A method of recovering a call between a wireless unit and a wireless communications system comprising the steps of:

after having lost communication between said wireless unit and a first set of base station(s) servicing said call, autonomously changing from said first set of base station(s) to a second set of base station(s), independent of said wireless unit and based on information known to be at both the wireless unit and the wireless communications system before said communication between said wireless unit and said first set of serving base station(s) is lost such that said second set of base station(s) is automatically established both at said wireless communications system and said wireless unit without requiring communication between said wireless communications system and said wireless unit, to service said call; and communicating with said wireless unit using a second set of serving base station(s) to continue said call.

7. The method of claim 6 wherein said step of communicating comprising the step of:

using a channel which can be determined at both the wireless communication system and at the wireless unit before said communication is lost between said wireless unit and said first set of serving base station(s) to receive communications from said at least one of said second set of base station(s) after said communication is lost with said first set of serving base station(s).

8. The method of claim 7 wherein said step of using including the step of:

using, after communication between said wireless unit and a first set of serving base station(s) is lost, a candidate list identified with a previous pilot strength measurement message (PSMM) known to have been successfully reported to the wireless communications system before said communication between said wireless unit and said first set of serving base station(s) is lost to establish said second set of base station(s) at said wireless unit and said wireless communications system to service said call between said wireless unit and said wireless communications system.

9. The method of claim 8 wherein said step of changing including the step of:

automatically designating base station(s) in said candidate set as active.

10. The method of claim 9 further comprising:

transmitting a channel assignment message, over a predetermined control channel from at least one of said second set of base station(s), which provides at least forward channel assignments for said at least one of said second set of base station(s).

11. A wireless unit comprising:

processing circuitry configured to, after having lost communication between said wireless unit and a first set of base station(s) servicing said call, autonomously change from said first set of base station(s) to a second set of base station(s), independent of said wireless communications system and based on information known to be at both the wireless unit and the wireless communications system before said communication between said wireless unit and said first set of serving base station(s) is lost such that said second set of base station(s) is automatically established both at said wireless communications system and said wireless unit without requiring communication between said wireless communication system and said wireless unit, to service said call, and further configured to communicate with said second set of serving base station(s) to continue said call.

12. A wireless communications system comprising:

processing circuitry configured to, after having lost communication between said wireless unit and a first set of base station(s) servicing said call, autonomously change from said first set of base station(s) to a second set of base station(s), independent of said wireless unit and based on information known to be at both the wireless unit and the wireless communications system before said communication between said wireless unit and said first set of serving base station(s) is lost such that said second set of base station(s) is automatically established both at said wireless communications system and said wireless unit without requiring communication between said wireless communications system and said wireless unit, to service said call, and further configured to communicate with said wireless unit using a second set of serving base station(s) to continue said call.

* * * * *